United States Patent
Sugihara

(10) Patent No.: US 12,043,328 B2
(45) Date of Patent: Jul. 23, 2024

(54) CRAWLER TRAVELING APPARATUS, CRAWLER MONITORING SYSTEM, CRAWLER TRAVELING VEHICLE AND CRAWLER MONITORING METHOD

(71) Applicant: BRIDGESTONE CORPORATION, Tokyo (JP)

(72) Inventor: Shingo Sugihara, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 828 days.

(21) Appl. No.: 17/110,289

(22) Filed: Dec. 3, 2020

(65) Prior Publication Data
US 2021/0171134 A1 Jun. 10, 2021

(30) Foreign Application Priority Data
Dec. 5, 2019 (JP) ................................. 2019-220322

(51) Int. Cl.
*B62D 55/30* (2006.01)
*B62D 55/24* (2006.01)

(52) U.S. Cl.
CPC .............. *B62D 55/30* (2013.01); *B62D 55/24* (2013.01)

(58) Field of Classification Search
CPC ................................. B62D 55/30; B62D 55/24
See application file for complete search history.

(56) References Cited

U.S. PATENT DOCUMENTS

| | | | | |
|---|---|---|---|---|
| 4,948,201 A * | 8/1990 | Furuta | .................. | B62D 55/202 305/176 |
| 5,145,242 A * | 9/1992 | Togashi | ................. | B62D 55/24 305/171 |
| 6,948,783 B2 * | 9/2005 | Hoff | ....................... | B62D 55/30 305/144 |
| 7,300,119 B2 * | 11/2007 | Ueno | ..................... | B62D 55/24 305/165 |
| 9,016,810 B2 * | 4/2015 | Busley | ................... | B62D 55/30 305/125 |
| 9,334,000 B2 * | 5/2016 | Nomizo | ................. | B62D 55/26 |
| 9,581,216 B2 * | 2/2017 | Parizek | .................. | F16F 9/063 |
| 10,099,735 B2 * | 10/2018 | Vik | ......................... | B62D 55/30 |

(Continued)

FOREIGN PATENT DOCUMENTS

JP S5391145 U 7/1978
JP S54111038 U 8/1979

(Continued)

*Primary Examiner* — Jason R Bellinger
(74) *Attorney, Agent, or Firm* — KENJA IP LAW PC

(57) ABSTRACT

A crawler traveling apparatus according to the present disclosure includes an endless rubber crawler, a drive wheel, a tension wheel, and a sensor which can acquire load information related to a load that the tension wheel receives from the rubber crawler. The rubber crawler includes an endless crawler belt and a plurality of cores, each core including a pair of core projections. The tension wheel abuts an inner surface of the rubber crawler at least, in a crawler width direction, at any of a position between the pair of core projections and both outer positions of the pair of core projections to be rotated following the rubber crawler, and the sensor can acquire tension load information in a crawler thickness direction that the tension wheel receives from the inner surface of the rubber crawler as the load information.

11 Claims, 7 Drawing Sheets

(56) References Cited

U.S. PATENT DOCUMENTS

| | | | |
|---|---|---|---|
| 2003/0117017 A1* | 6/2003 | Hoff | B62D 55/30 |
| | | | 305/143 |
| 2005/0029866 A1 | 2/2005 | Tamaru et al. | |
| 2016/0311481 A1* | 10/2016 | Grant | B62D 55/30 |
| 2017/0242447 A1 | 8/2017 | Brian et al. | |
| 2021/0171133 A1* | 6/2021 | Kondo | B62D 55/092 |

FOREIGN PATENT DOCUMENTS

| | | | | |
|---|---|---|---|---|
| JP | S58107980 U | | 7/1983 | |
| JP | 60001082 A | * | 1/1985 | ............. B62D 55/24 |
| JP | 2005035532 A | | 2/2005 | |
| WO | 2017075652 A1 | | 5/2017 | |

* cited by examiner

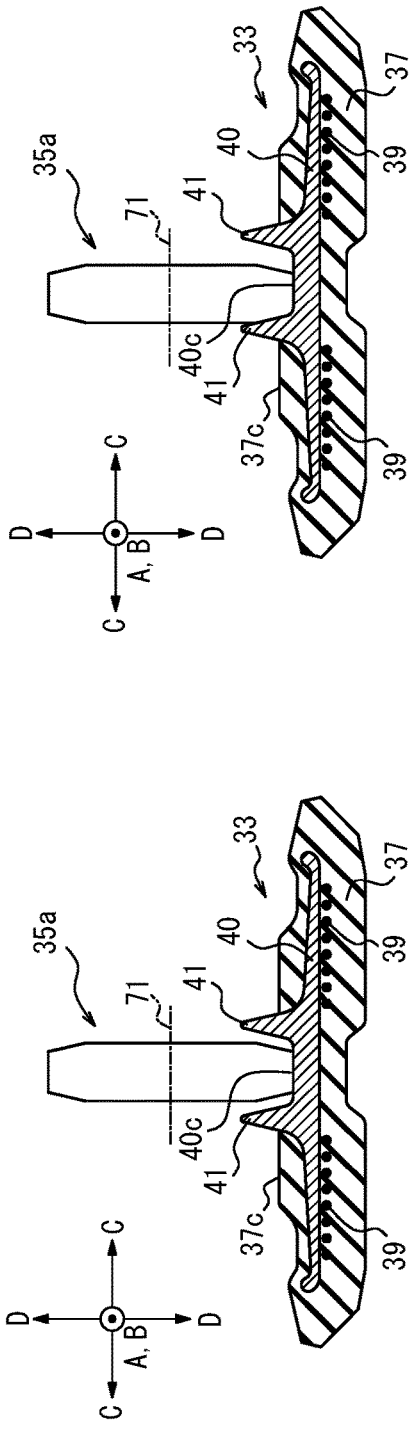
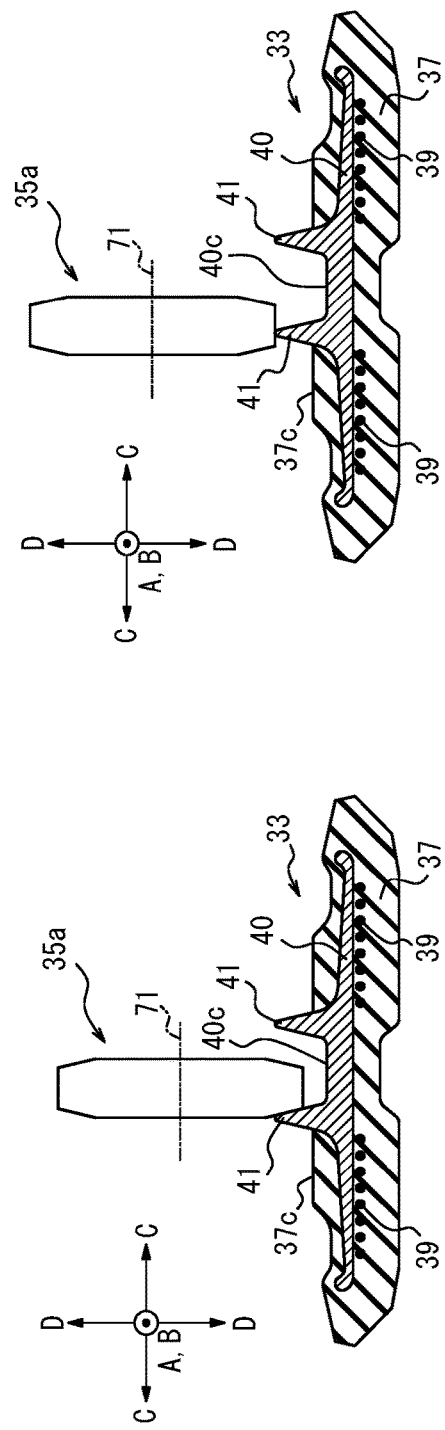

CRAWLER TRAVELING APPARATUS, CRAWLER MONITORING SYSTEM, CRAWLER TRAVELING VEHICLE AND CRAWLER MONITORING METHOD

TECHNICAL FIELD

The present disclosure relates to a crawler traveling apparatus, a crawler monitoring system, a crawler traveling vehicle and a crawler monitoring method.

BACKGROUND

Conventionally, a work vehicle including a machine body which is supported by a crawler traveling apparatus having an endless rubber crawler such that the machine body is self-propelled has been known. US20170242446A1 (PTL 1) and US20170242447A1 (PTL 2) disclose this kind of work vehicle.

In the work vehicle disclosed in PTL 1 and PTL 2, a support beam which supports an idler wheel of the crawler traveling apparatus is supported by the machine body by a pivot pin. In the work vehicle disclosed in PTL 1, a load applied to the pivot pin is monitored, and a speed of the word vehicle is controlled. In the work vehicle disclosed in PTL 2, an axle load is evaluated from a load applied to the pivot pin, and an operation of the work vehicle is controlled based on the evaluated axle load.

CITATION LIST

Patent Literature

PTL 1: US20170242446A1
PTL 2: US20170242447A1

SUMMARY

In the work vehicle including the rubber crawler as disclosed in PTL 1 and PTL 2, for example, in a sudden cornering situation or during an operation on an inclined surface, a tension wheel as an idler wheel may be disengaged from the rubber crawler. The work vehicle as a crawler traveling vehicle disclosed in PTL 1 and PTL 2 cannot detect disengagement of the tension wheel from the rubber crawler. Occurrence of wheel-disengagement causes downtime, which causes work delay. Consequently, to prevent the wheel-disengagement previously, an operator of the crawler traveling vehicle is required to grasp a sign of the wheel-disengagement sensuously from an attitude of the machine body, a traveling state, a sound etc. to take measures against wheel-disengagement. However, sensuously grasping the sign of the wheel-disengagement is not easy for the operator.

An object of the present disclosure is to provide a crawler traveling apparatus, a crawler monitoring system, a crawler traveling vehicle and a crawler monitoring method which can detect a sign that the tension wheel is disengaged from the rubber crawler.

According to a first aspect of the present disclosure, there is provided a crawler traveling apparatus including: an endless rubber crawler; a drive wheel which drives to rotate the rubber crawler in a crawler circumferential direction; a tension wheel which stretches the rubber crawler together with the drive wheel to be rotated accompanied by rotation of the rubber crawler; and a sensor which can acquire load information related to a load that the tension wheel receives from the rubber crawler, wherein the rubber crawler includes an endless crawler belt and a plurality of cores which are arranged along the crawler circumferential direction of the crawler belt with an interval and embedded in the crawler belt, each core includes a pair of core projections which project from an inner surface of the crawler belt to an inner side and are arranged in a crawler width direction with an interval, the tension wheel abuts an inner surface of the rubber crawler at least, in the crawler width direction, at any of a position between the pair of core projections and both outer positions of the pair of core projections to be rotated following the rubber crawler, the sensor can acquire tension load information in a crawler thickness direction that the tension wheel receives from the inner surface of the rubber crawler as the load information.

According to a second aspect of the present disclosure, there is provided a crawler monitoring system including the above-described crawler traveling apparatus and a control device which compares the tension load information acquired by the sensor with a predetermined threshold value to execute processing in accordance with a comparison result.

According to a third aspect of the present disclosure, there is provided a crawler traveling vehicle including: a machine body; and a crawler traveling apparatus which supports the machine body such that the machine body is self-propelled, the crawler traveling apparatus includes: an endless rubber crawler; a drive wheel which drives to rotate the rubber crawler in a crawler circumferential direction; a tension wheel which stretches the rubber crawler together with the drive wheel to be rotated accompanied by rotation of the rubber crawler; and a sensor which can acquire load information related to a load that the tension wheel receives from the rubber crawler, wherein the machine body includes a control device which compares the load information acquired by the sensor with a predetermined threshold value to execute processing in accordance with a comparison result, the rubber crawler includes: an endless crawler belt; and a plurality of cores which are arranged along the crawler circumferential direction of the crawler belt with an interval and embedded in the crawler belt, wherein each core includes a pair of core projections which protrude from an inner surface of the crawler belt to an inner side and are arranged in a crawler width direction with an interval, the tension wheel abuts an inner surface of the rubber crawler at least, in the crawler width direction, at any of a position between the pair of core projections and both outer positions of the pair of core projections to be rotated following the rubber crawler, the sensor can acquire tension load information in a crawler thickness direction that the tension wheel receives from the inner surface of the rubber crawler as the load information, the control device compares the tension load information acquired by the sensor with a predetermined threshold value to execute processing in accordance with a comparison result.

According to a fourth aspect of the present disclosure, there is provided a crawler monitoring method of monitoring disengagement of a tension wheel from an endless rubber crawler based on load information related to a load that the tension wheel receives from the rubber crawler stretched by a drive wheel and the tension wheel, wherein the rubber crawler includes an endless crawler belt and a plurality of cores which are arranged along a crawler circumferential direction of the crawler belt with an interval and embedded in the crawler belt, each core includes a pair of core projections which project from an inner surface of the crawler belt to an inner side and are arranged in a crawler width direction with an interval, the tension wheel abuts an inner surface of the rubber crawler at least, in the crawler width direction, at any of a position between the pair of core projections and both outer positions of the pair of core projections to be rotated following the rubber crawler, disengagement of the tension wheel from the rubber crawler is monitored based on, of the load information, tension load information in a crawler thickness direction that the tension wheel receives from the inner surface of the rubber crawler.

According to the present disclosure, the crawler traveling apparatus, the crawler monitoring system, the crawler traveling vehicle and the crawler monitoring method which can detect the sign that the tension wheel is disengaged from the rubber crawler can be provided.

BRIEF DESCRIPTION OF THE DRAWINGS

In the accompanying drawings:

FIG. 5A to FIG. 5D are schematic diagrams illustrating an outline of a series of operations in which the tension wheel illustrated in FIG. 1 is disengaged from the rubber crawler;

DETAILED DESCRIPTION

Figure 1:
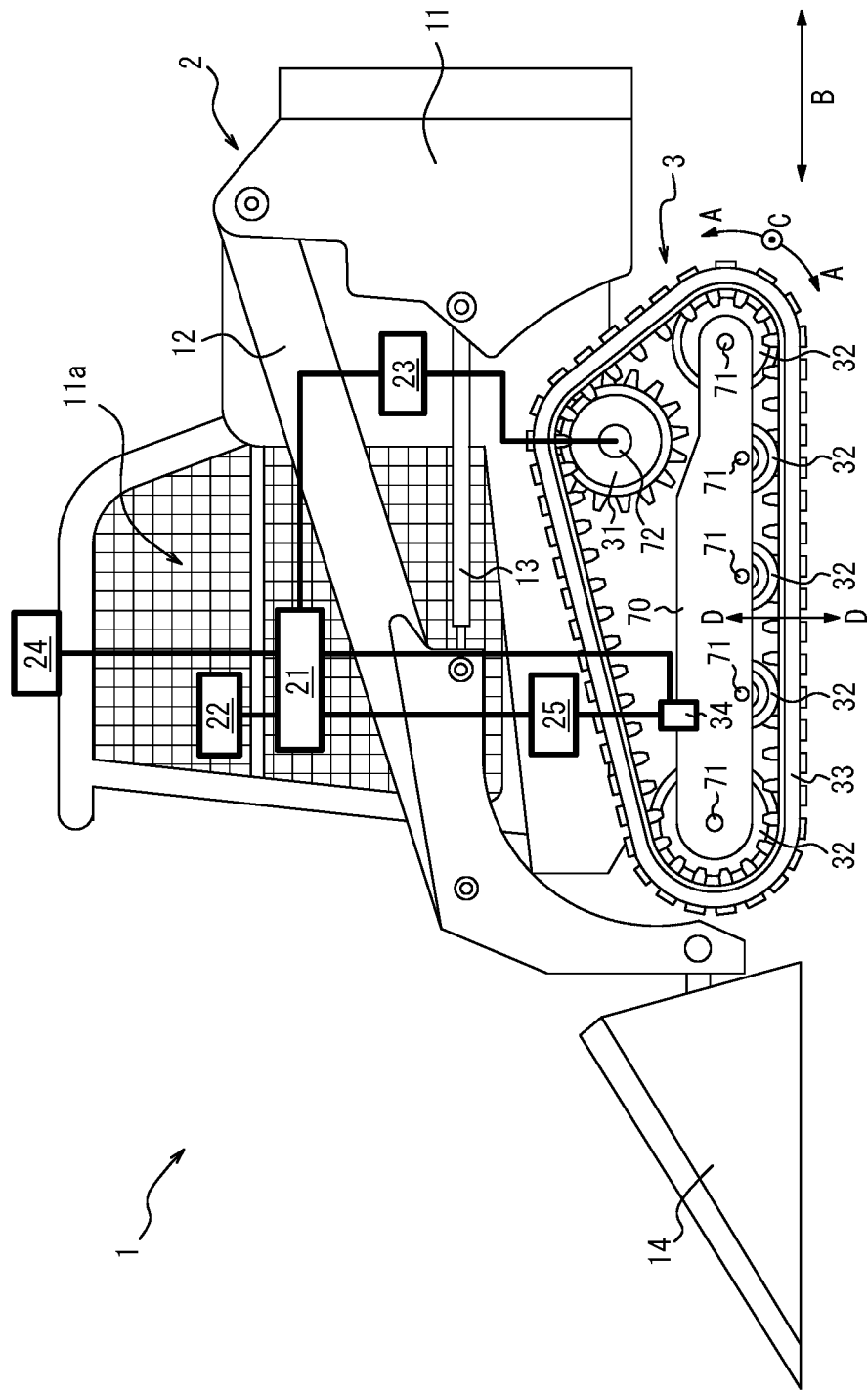
FIG. 1 is a side view of a crawler traveling vehicle as one embodiment of the present disclosure.

Hereinafter, an embodiment of a crawler traveling apparatus, a crawler monitoring system, a crawler traveling vehicle and a crawler monitoring method according to the present disclosure will be explained with illustration with reference to the drawings. In each drawing, common members and portions are applied the same reference numerals.

FIG. 1 is a side view of a crawler traveling vehicle 1 as one embodiment of the present disclosure. As illustrated in FIG. 1, the crawler traveling vehicle 1 includes a machine body 2 and a crawler traveling apparatus 3 as one embodiment of the present disclosure. The crawler traveling apparatus 3 supports the machine body 2 such that the machine body 2 is self-propelled. The crawler traveling vehicle 1 includes a pair of crawler traveling apparatuses 3. The pair of crawler traveling apparatuses 3 are attached to the machine body 2 rotatably to the machine body 2 at both sides in a width direction of the machine body 2.

The crawler traveling vehicle 1 of this embodiment illustrated in FIG. 1 is a compact track loader. However, the crawler traveling vehicle according to the present disclosure is not limited to a compact track loader, and may be a crawler traveling vehicle for other works.

The machine body 2 of this embodiment includes a machine main body 11, a machine body arm 12 and a hydraulic cylinder 13. The machine body arm 12 is attached to be vertically movable to the machine main body 11. The vertical movement of the machine body arm 12 to the machine main body 11 is executed by expansion and contraction of the hydraulic cylinder 13. To the machine main body 11, an operator's cab 11a which an operator can get in is provided. The vertical movement of the above-described machine body arm 12 can be controlled through an operation of an operating device 22 provided to the operator's cab 11a. While a bucket 14 is attached at a tip portion of the machine body arm 12 illustrated in FIG. 1, this is not limited to the bucket 14. To the tip portion of the machine body arm 12, an attachment in accordance with a work can be attached, including a bucket having a different shape from that of the bucket 14 illustrated in FIG. 1, various forks, and others.

Also, the machine body 2 includes a control device 21, the operating device 22, a drive device 23, a notification device 24 and a pressure adjusting device 25.

The control device 21 includes a processing section constituted by a processor, for example, a CPU (Central Processing Unit) and an MPU (Micro-Processing Unit). The control device 21 includes a storage section constituted by a memory, for example, a ROM (Read Only Memory) and a RAM (Random Access Memory). The storage section stores a program etc. for operating the operating device 22, the drive device 23, the notification device 24, the pressure adjusting device 25, etc. The processing section executes the program stored in the storage section to activate the operating device 22, the drive device 23, the notification device 24, the pressure adjusting device 25, etc. The machine body 2 may include a storage device which is different from the control device 21 in addition to or instead of the storage section of the control device 21.

The operating device 22 includes an operating section constituted by a touch panel, a button switch, a keyboard, etc. and an input section for inputting operation information based on the operation by the operating section to the control device 21. The configuration of the operating device 22 is not particularly limited, and any configuration may be applied as long as the operation information based on the operation by the operator can be inputted into the control device 21.

The drive device 23 can drive the crawler traveling apparatus 3. The drive device 23 includes a power source such as an engine. The crawler traveling apparatus 3 is driven by a driving force from the power source. The driving of the crawler traveling apparatus 3 by the drive device 23 is controlled by the control device 21. Also, the drive device 23 can drive the hydraulic cylinder 13. The control device 21 can control the vertical movement of the machine body arm 12 to the machine main body 11 by controlling the drive of the hydraulic cylinder 13 by the drive device 23.

The notification device 24 includes a notification section constituted by a liquid crystal panel, a speaker, etc. The control device 21 controls the notification device 24 based on acquisition information acquired by a sensor 34 of the crawler traveling apparatus 3 which will be described later. More specifically, the control device 21 can notify the operator in the operator's cab 11a of notification information in accordance with the acquisition information acquired by the sensor 34 through the notification section of the notification device 24. The notification information may be any information as long as it is information which can be perceived through visual perception, auditory perception, etc., and is not particularly limited. The notification information may be display information such as a symbol, a letter and a color to be displayed on a display including a liquid crystal panel, or may be sound information emitted from a sound emitting section including a speaker. A touch panel used as the notification section may be also used as the operation section of the operating device 22.

Also, the control device 21, the operating device 22 and the notification device 24 may be constituted by one computer including these components. The computer including the control device 21, the operating device 22 and the notification device 24 may further include other devices including a communication device and a storage device.

The pressure adjusting device 25 can adjust an internal pressure of a fluid element 51 in a biasing body 50 of the crawler traveling apparatus 3 while will be described later, and adjust a pressing force to a rubber crawler 33 by a tension wheel which will be described later. The pressure adjusting device 25 includes, for example, a power source such as a hydraulic pump. The adjustment of the internal pressure of the fluid element 51 by the pressure adjusting device 25 is controlled by the control device 21, for example.

Figure 2:
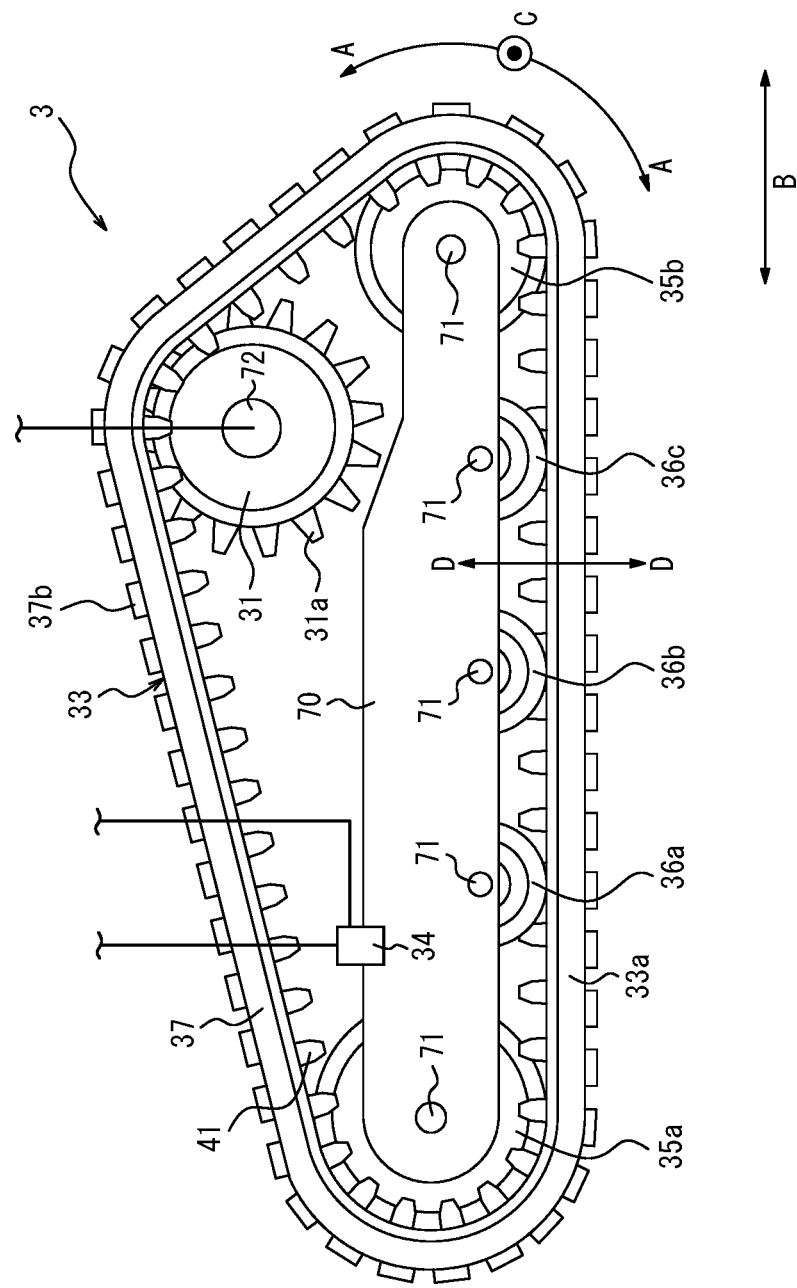
FIG. 2 is an enlarged view of the crawler traveling apparatus illustrated in FIG. 1.
Figure 3:
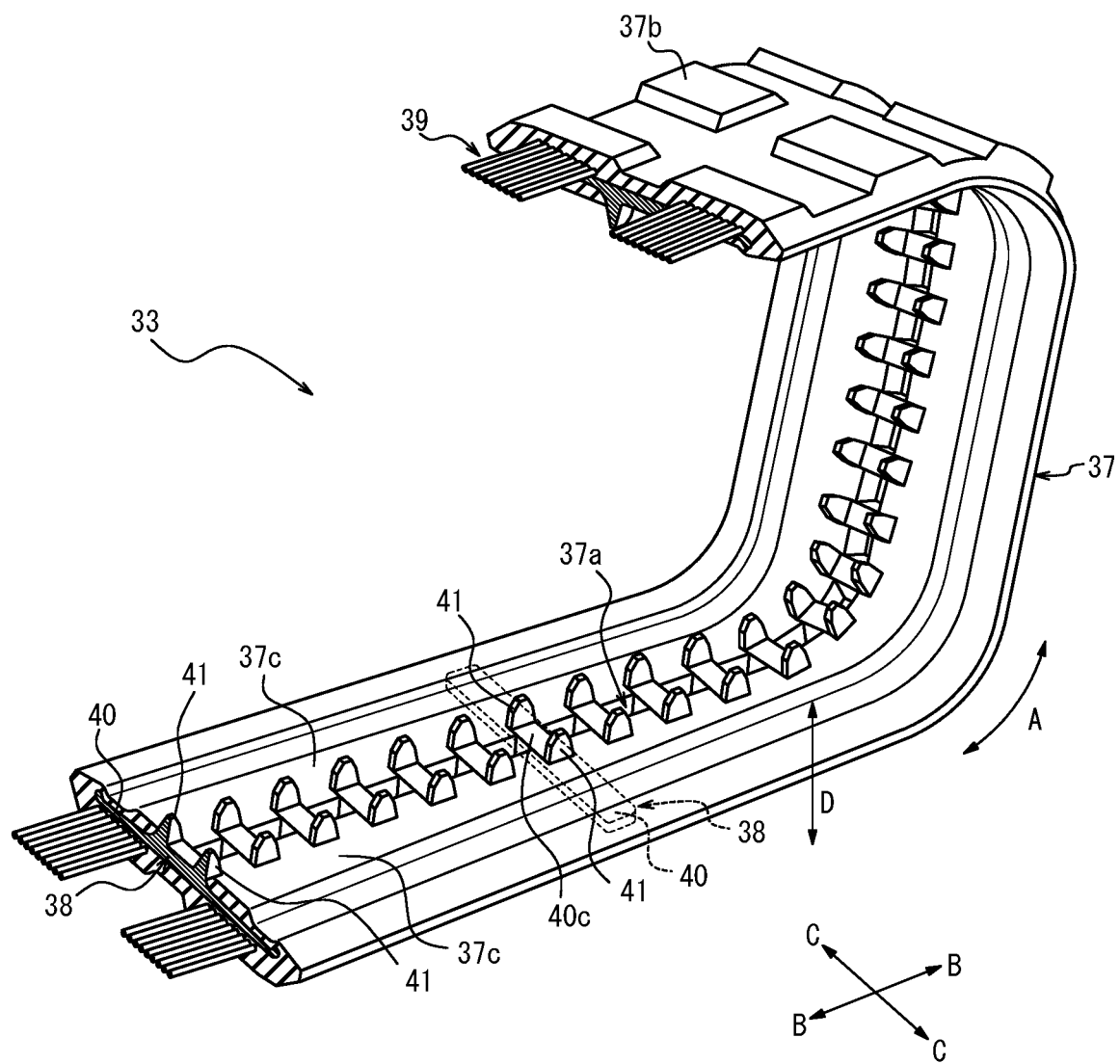
FIG. 3 is a drawing illustrating a detail of a rubber crawler illustrated in FIG. 1.

FIG. 2 is an enlarged view in which the crawler traveling apparatus 3 illustrated in FIG. 1 is enlarged and illustrated. As illustrated in FIGS. 1 and 2, the crawler traveling apparatus 3 includes a drive wheel 31, an idler wheel 32, the endless rubber crawler 33, the sensor 34 and the biasing body 50. FIG. 3 is a cross-section perspective view illustrating the detail of the rubber crawler 33.

The drive wheel 31 and the idler wheel 32 are attached rotatably to the machine body 2. The drive wheel 31 and the idler wheel 32 may be directly or indirectly attached rotatably to the machine body 2. The drive wheel 31 and the idler wheel 32 may be attached rotatably to a rotating shaft of the machine body 2, or may be attached rotatably to a rotating shaft provided to another member fixed to the machine body 2. The drive wheel 31 of this embodiment is attached rotatably to a rotating shaft 72 of the machine main body 11 of the machine body 2. The idler wheel 32 of this embodiment is attached rotatably to a shaft portion 71 attached to a frame member 70 fixed to the machine main body 11 of the machine body 2. The drive wheel 31 is driven to rotate to a forward traveling side or a backward traveling side by the drive device 23 of the machine body 2. The rotational drive of the drive wheel 31 by the drive device 23 is controlled by the control device 21. The rubber crawler 33 is driven to rotate in a crawler circumferential direction A by the drive wheel 31. The idler wheel 32 is rotated following the rubber crawler 33 which is driven to rotate by the rotation of the drive wheel 31.

The drive wheel 31 of this embodiment is a sprocket. Consequently, the drive wheel 31 of this embodiment includes a plurality of projections 31a arranged with a predetermined pitch over the entire area in a circumferential direction to protrude toward a radially outer side. The drive wheel 31 drives the rubber crawler 33 to rotate in the crawler circumferential direction A since the plurality of projections 31a rotate while they are sequentially fitted to a plurality of recesses 37a provided at an inner surface of the rubber crawler 33 arranged in the crawler circumferential direction A.

The idler wheel 32 abuts the inner surface of the rubber crawler 33 and is rotated following the rubber crawler 33. The idler wheel 32 may abut the inner surface of the rubber crawler 33, in a crawler width direction C, at any of a position between a pair of core projections 41 of a core 38 of the rubber crawler 33 which will be explained later. The idler wheel 32 may abut the inner surface of the rubber crawler 33, in a crawler width direction C, at both outer positions of the pair of core projections 41. The idler wheel 32 may abut the inner surface of the rubber crawler 33 both at the above position between a pair of core projections 41 and at the above outer positions of the pair of core projections 41.

The crawler traveling apparatus 3 of this embodiment includes both the tension wheel as the idler wheel 32 and a track roller as the idler wheel 32. As illustrated in FIGS. 1 and 2, the tension wheel and the track roller of this embodiment rotate about the shaft portion 71 attached to the frame member 70 fixed to the machine body 2.

The tension wheel stretches the rubber crawler 33 together with the drive wheel 31. Also, the tension wheel is rotated accompanied by the rotation of the rubber crawler 33. More specifically, the tension wheel of this embodiment abuts an inner surface 40c of a core body 40 which will be explained later at the position between the pair of core projections 41 which will be explained later in the crawler width direction C and is rotated following the rubber crawler 33. The inner surface 40c of the core body 40 constitutes a part of the inner surface of the rubber crawler 33. However, the tension wheel may be configured to abut the inner surface of the rubber crawler 33 at the both outer positions of the pair of core projections 41 which will be explained later in the crawler width direction C to be rotated following the rubber crawler 33.

While the crawler traveling apparatus 3 of this embodiment includes two tension wheels, the number of tension wheels is not limited to two. One tension wheel or three or more tension wheels may be applied.

The two tension wheels of this embodiment are constituted by a forward traveling side tension wheel 35a used as a front idler wheel and a backward traveling side tension wheel 35b used as a rear idler wheel. The forward traveling side tension wheel 35a and the backward traveling side tension wheel 35b contact the inner surface of the rubber crawler 33. Also, the forward traveling side tension wheel 35a and the backward traveling side tension wheel 35b contact a contact patch via the rubber crawler 33. The rubber crawler 33 of this embodiment is applied a tension by the forward traveling side tension wheel 35a, the backward traveling side tension wheel 35b and the drive wheel 31. The drive wheel 31 is positioned at an upper side in a vertical direction from the forward traveling side tension wheel 35a and the backward traveling side tension wheel 35b. Due to this, the rubber crawler 33 of this embodiment has a substantially triangular outer shape in a side view (see FIG. 2 etc.) However, for example, the rubber crawler 33 may be stretched by the drive wheel 31 disposed at one side of the forward traveling side and the backward traveling side and one tension wheel disposed at the other side of the forward traveling side and the backward traveling side. In this case, the rubber crawler 33 has an oval outer shape which is elongated in a front-rear direction B in which a portion stretched between the drive wheel 31 and the tension wheel linearly extends in the front-rear direction B in the side view.

The forward traveling side tension wheel 35a of this embodiment is biased toward the inner surface of the rubber crawler 33 by the biasing body 50 which will be explained later. In other words, the tension of the rubber crawler 33 can be adjusted by changing a biasing force to the forward traveling side tension wheel 35a by the biasing body 50. The details of the biasing body 50 of this embodiment will be explained later (see FIGS. 5 and 6).

The track roller abuts the inner surface of the rubber crawler 33 to which the tension is applied by the drive wheel 31 and the tension wheel to be rotated following the rubber crawler 33. More specifically, the track roller of this embodiment abuts an inner surface 37c of a crawler belt 37 which will be explained later at the both outer positions of the pair of core projections 41 which will be explained later in the crawler width direction C and is rotated following the rubber crawler 33. The inner surface 37c of the crawler belt 37 constitutes a part of the inner surface of the rubber crawler 33. However, the track roller may be configured to abut the inner surface of the rubber crawler 33 at the position between the pair of core projections 41 which will be explained later in the crawler width direction C to be rotated following the rubber crawler 33.

While the crawler traveling apparatus 3 of this embodiment includes three track rollers, the number of the track rollers is not limited to three. Less than three, or four or more track rollers may be applied.

The three track rollers of this embodiment are constituted by a forward traveling side track roller 36a, an intermediate track roller 36b and a backward traveling side track roller 36c. The three track rollers of this embodiment contact the contact patch via the rubber crawler 33. In other words, the three track rollers of this embodiment contact an inner surface of a ground contact region 33a of the rubber crawler 33, which is stretched between the forward traveling side tension wheel 35a and a backward traveling side tension wheel 35b, with an outer circumferential surface of the ground contact region 33a contacting the contact patch. The forward traveling side track roller 36a is arranged at a position which is closest to the forward traveling side tension wheel 35a in the inner surface of the ground contact region 33a of the rubber crawler 33. The backward traveling side track roller 36c is arranged at a position which is closest to the backward traveling side tension wheel 35b in the inner surface of the ground contact region 33a of the rubber crawler 33. The intermediate track roller 36b is arranged between the forward traveling side track roller 36a and the backward traveling side track roller 36c in the front-rear direction B. While the crawler traveling apparatus 3 of this embodiment includes only one intermediate track roller 36b, a configuration of including two or more intermediate track rollers 36b may be applied. Also, the crawler traveling apparatus 3 may include another track roller which abuts, of the rubber crawler 33, an inner surface of a portion stretched between the drive wheel 31 and the forward traveling side tension wheel 35a or an inner surface of a portion stretched between the drive wheel 31 and the backward traveling side tension wheel 35b.

The endless rubber crawler 33 is wound around the drive wheel 31 and the idler wheel 32.

As illustrated in FIG. 3, the rubber crawler 33 includes the endless crawler belt 37, a plurality of cores 38 and a reinforcement cord layer 39.

An outer circumferential surface of the crawler belt 37 is a surface which contacts the contact patch and in which lugs 37b projecting toward an outer side are formed over the entire area in the crawler circumferential direction A with intervals. An inner circumferential surface of the crawler belt 37 is formed with the plurality of recesses 37a to which the projections 31a of the drive wheel 31 are fitted. More specifically, each recess 37a is formed between the cores 38 which are adjacent in the crawler circumferential direction A at the position between the pair of core projections 41 which will be explained later in the crawler width direction C.

As illustrated in FIG. 3, the plurality of cores 38 are arranged along the crawler circumferential direction A of the crawler belt 37 with intervals. Also, the plurality of cores 38 are embedded in the crawler belt 37.

More specifically, the core 38 includes the plate-like core body 40 embedded in the crawler belt 37 to extend in the crawler width direction C and the pair of core projections 41 projecting from the core body 40. The plate-like core body 40 is embedded in the crawler belt 37 such that its thickness direction substantially corresponds to a crawler thickness direction D. The pair of core projections 41 project toward an inner side of the rubber crawler 33 than the crawler belt 37. Also, the pair of core projections 41 are arranged with an interval in the crawler width direction C. Further, the pair of core projections 41 are arranged to face each other in the crawler width direction C. Of the core body 40, an inner surface 40c of a portion between the pair of core projections 41 in the crawler width direction C is exposed to the inner side of the rubber crawler 33 to constitute a part of the inner surface of the rubber crawler 33.

The reinforcement cord layer 39 is constituted by a plurality of steel cords embedded in the crawler belt 37 and arranged in parallel. The reinforcement cord layer 39 is embedded at an outer circumferential surface side of the crawler belt 37 than the core body 40. While the rubber crawler 33 of this embodiment is configured to include the reinforcement cord layer 39, not limited to this configuration, a rubber crawler not including the reinforcement cord layer 39 may be applied.

The sensor 34 can acquire load information related to a load that the tension wheel receives from the rubber crawler 33. The load information may be various information correlated with the load, not limited to the load itself. More specifically, the sensor 34 can acquire load information in the crawler thickness direction D (hereinafter, it is referred to as "tension load information") that the tension wheel receives from the inner surface of the rubber crawler 33 as the load information. The tension load information may be, for example, an electric signal correlated with the load. Use of the tension load information acquired by the sensor 34 can inhibit disengagement of the tension wheel from the rubber crawler 33. The details will be explained later (see FIG. 7 etc.)

As illustrated in FIGS. 1 and 2, in this embodiment, the forward traveling side tension wheel 35a is the tension wheel on which the tension load information is acquired by the sensor 34. However, the backward traveling side tension wheel 35b may be applied.

The sensor 34 is not particularly limited as long as it is a sensor which can directly or indirectly acquire the tension load information such as a load sensor and a pressure sensor. Although the detail will be described later, the sensor 34 of this embodiment is a pressure sensor which can acquire the pressure of the fluid element 51 of the biasing body 50 which will be described later as the tension load information. The pressure sensor as the 10) sensor 34 is attached to a connecting section 52b of a cylinder 52 which will be explained later. The details will be explained later.

Figure 4:
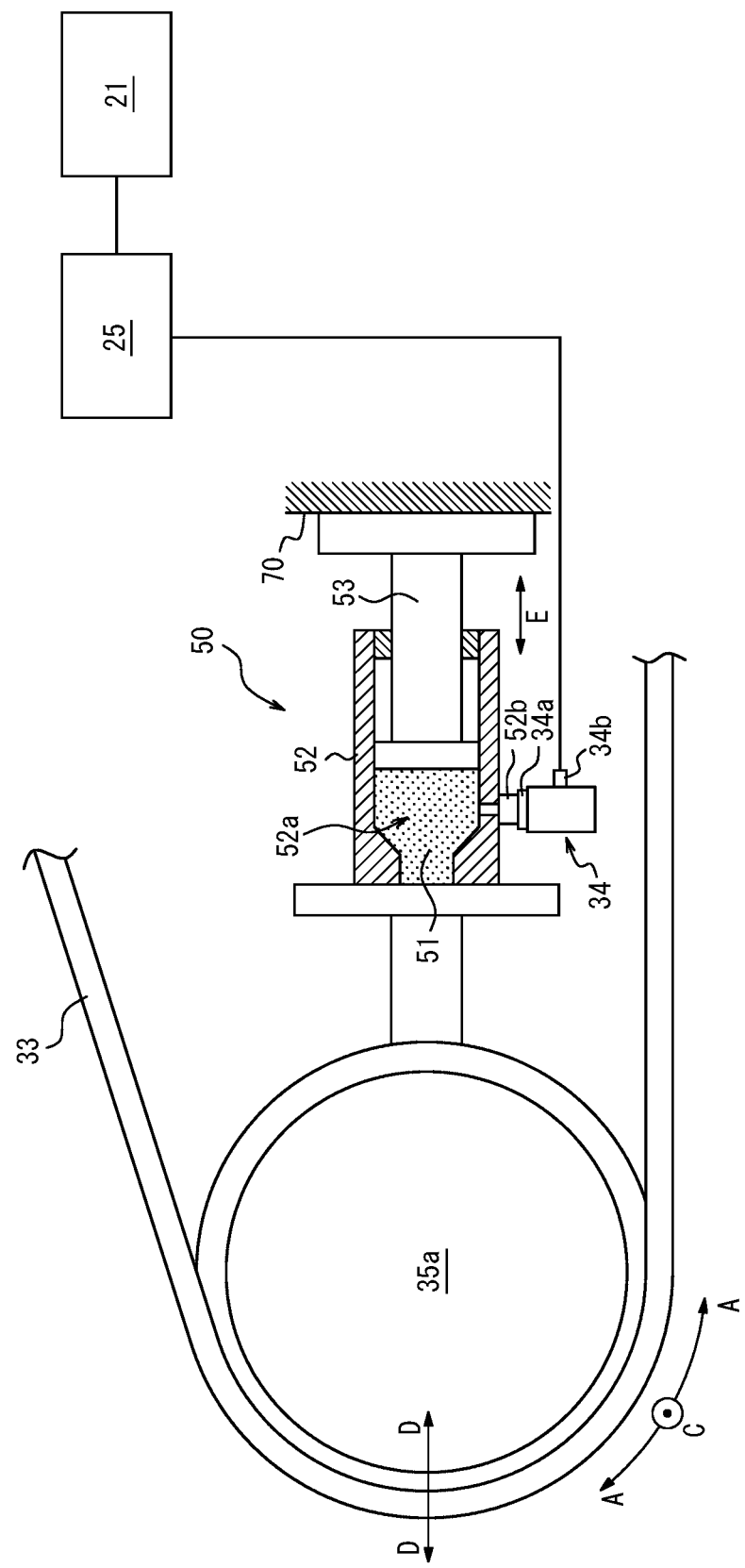
FIG. 4 is a drawing illustrating a biasing body of the crawler traveling apparatus illustrated in FIG. 2.

FIG. 4 is a drawing illustrating the biasing body 50 of this embodiment. As illustrated in FIG. 4, the biasing body 50 biases the tension wheel toward the inner surface of the rubber crawler 33. The biasing body 50 of this embodiment biases the forward traveling side tension wheel 35a of the two tension wheels toward the inner surface of the rubber crawler 33. The sensor 34 of this embodiment acquires biasing load information that the biasing body 50 receives from the tension wheel as the tension load information. Since the biasing body 50 biases the forward traveling side tension wheel 35a in this embodiment, the sensor 34 of this embodiment 20 acquires the biasing load information that the biasing body 50 receives from the forward traveling side tension wheel 35a as the tension load information. However, the biasing body 50 may bias the backward traveling side tension wheel 35b. In this case, the sensor 34 may acquire the biasing load information that the biasing body 50 receives from the backward traveling side tension wheel 35b as the tension load information.

More specifically, the biasing body 50 of this embodiment includes the fluid element 51, the cylinder 52 and a piston rod 53. The cylinder 52 defines an accommodation space 52a in its inner portion to house the fluid element 51 in the accommodation space 52a. While gas including air or semi-fluid including grease may be used for example, the fluid element 51 is not particularly limited as long as it is a fluid element capable of compressive deformation. Also, an end of the cylinder 52 in an axial direction E is open, and the piston rod 53 enters the accommodation space 52a from the end of the cylinder 52. The piston rod 53 can compress the fluid element 51 housed in the accommodation space 52a by moving in the axial direction E of the cylinder 52.

Here, a connecting section 52b which can be connected to the pressure adjusting device 25 of the machine body 2 is provided to the cylinder 52 of the biasing body 50. The sensor 34 of this embodiment is attached to the connecting section 52b. By doing this, the sensor 34 can acquire the internal pressure of the fluid element 51 in the accommodation space 52a of the cylinder 52 as the biasing load information. Since the attachment of the sensor 34 is executed using the connecting section 52b for the pressure adjusting device 25, the sensor 34 can be easily provided. The pressure adjusting device 25 of this embodiment is connected to the biasing body 50 via the sensor 34. More specifically, the pressure adjusting device of this embodiment is connected to the connecting section 52b of the cylinder 52 of the biasing body 50 via the sensor 34. In other words, the sensor 34 of this embodiment includes a first connecting section 34a which can be connected to the connecting section 52b of the cylinder 52 of the biasing body 50 and a second connecting section 34b which can be connected to the pressure adjusting device 25. The configuration of the connecting section 52b of the biasing body 50 to which the sensor 34 and the pressure adjusting device 25 are attached is not particularly limited. The connecting section 52b can be configured by a connecting nipple to which the sensor 34 and the pressure adjusting device 25 are attached, for example.

While the machine body 2 includes the pressure adjusting device 25 in this embodiment, the machine body not including the pressure adjusting device 25 may be applied. For example, the pressure adjusting device 25 may be configured as an external device separated from the crawler traveling vehicle 1 to be used with connection to the connecting section 52b in accordance with need. In this case, when adjustment of the internal pressure of the fluid element 51 of the biasing body 50 is required, instead of the sensor 34 connected to the connecting section 52b of the cylinder 52, the pressure adjusting device 25 may be connected. In other words, while the pressure adjusting device 25 is connected to the biasing body 50 via the sensor 34 in the crawler traveling vehicle 1 of this embodiment, the configuration is not limited to this. Such a configuration may be applied that the sensor 34 and the pressure adjusting device 25 can be alternatively attached to the connecting section 52b of the biasing body 50. However, with the configuration that the pressure adjusting device 25 is connected to the biasing body 50 via the sensor 34 as in this embodiment, the pressure adjusting device 25 can be connected to the biasing body 50 without the need of removing the sensor 34. In this case, the tension load information can be acquired by the sensor 34 in a state that adjustment of the internal pressure of the fluid element 51 by the pressure adjusting device 25 is remained as possible.

A reaction force when the biasing body 50 biases the tension wheel may be secured by various regions fixed to the machine body 2 such as the frame member 70 fixed to the machine body 2.

Hereinafter, control such that disengagement of the tension wheel from the rubber crawler 33 is previously prevented based on the tension load information acquired by the sensor 34 will be explained in detail. Here, "disengagement of the tension wheel from the rubber crawler 33" means a state that the tension wheel overrides the core projection 41 of the core 38 of the rubber crawler 33 in the crawler width direction C.

FIGS. 5A to 5D are schematic diagrams illustrating an outline of a series of operations in which the tension wheel of this embodiment is disengaged from the rubber crawler 33. The tension wheel illustrated in FIGS. 5A to 5D is the forward traveling side tension wheel 35a. FIG. 5A is a drawing illustrating a position of the forward traveling side tension wheel 35a at a normal time when the forward traveling side tension wheel 35a is not disengaged from the rubber crawler 33. As illustrated in FIG. 5A, the forward traveling side tension wheel 35a of this embodiment rotates about the shaft portion 71 at the position between the pair of core projections 41 in the crawler width direction C at the normal time when the forward traveling side tension wheel 35a is not disengaged from the rubber crawler 33.

FIG. 5B is a drawing illustrating a state that, from a state illustrated in FIG. 5A, the forward traveling side tension wheel 35a is relatively moved to one side in the crawler width direction C to the rubber crawler 33 and the forward traveling side tension wheel 35a abuts a side surface of the core projection 41. FIG. 5C is a drawing illustrating a state that, from the state illustrated in FIG. 5B, the forward traveling side tension wheel 35a is further relatively moved to the one side in the crawler width direction C to the rubber crawler 33 and the forward traveling side tension wheel 35a is in the middle of overriding the side surface of the core projection 41. FIG. 5D is a drawing illustrating a state that, from the state illustrated in FIG. 5C, the forward traveling side tension wheel 35a is further relatively moved to the one side in the crawler width direction C to the rubber crawler 33 and the forward traveling side tension wheel 35a completely overrides the core projection 41.

Figure 6:
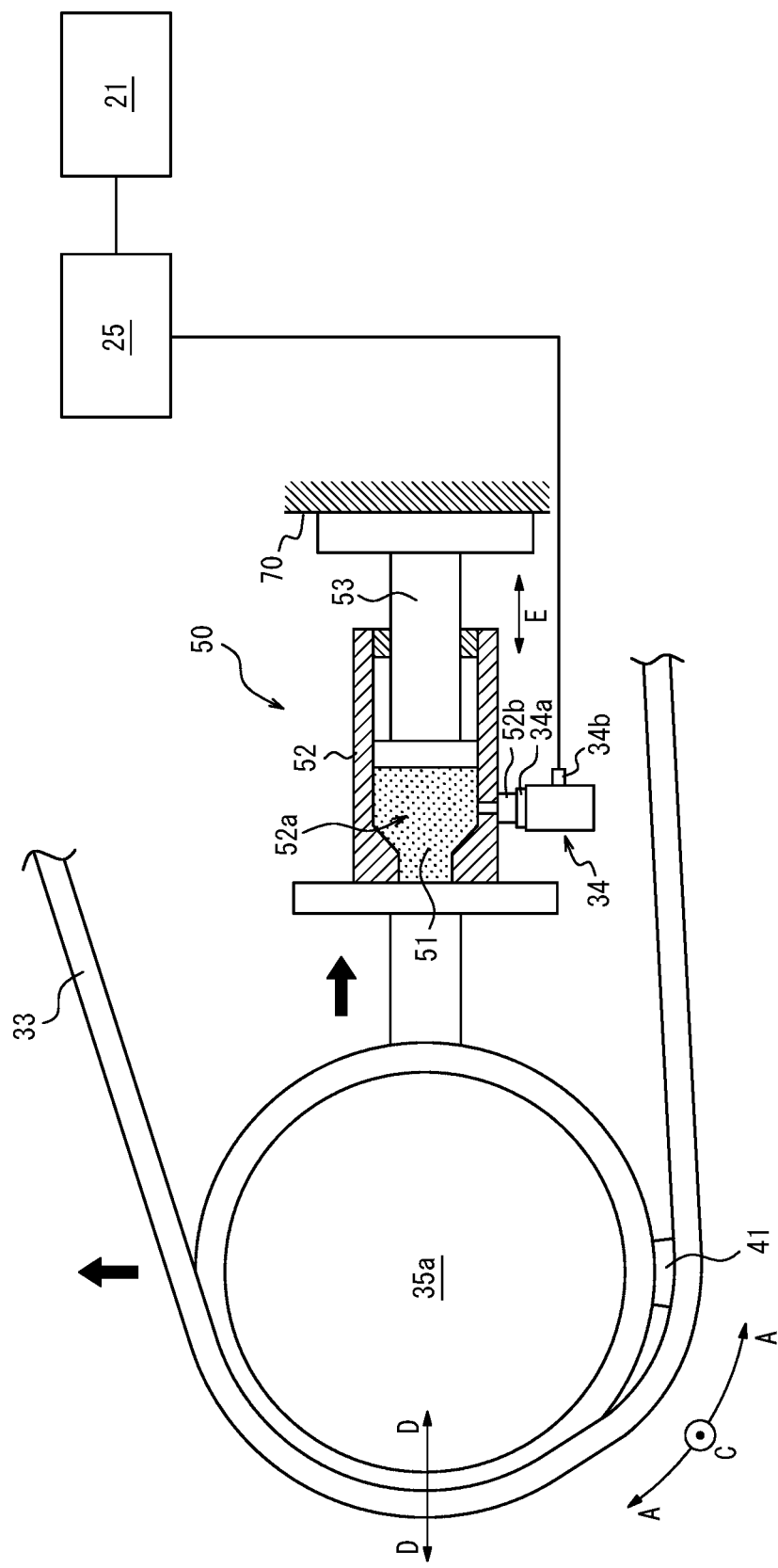
FIG. 6 is a drawing illustrating the biasing body of the crawler traveling apparatus illustrated in FIG. 2, illustrating a state that a forward traveling side tension wheel illustrated in FIG. 2 completely overrides a projection of a core.

FIG. 6 is a drawing illustrating the biasing body 50 of this embodiment in the same manner as FIG. 4. Additionally, while the forward traveling side tension wheel 35a illustrated in FIG. 4 is in a state of the normal time as illustrated in FIG. 5A, the forward traveling side tension wheel 35a illustrated in FIG. 6 is in a state of completely overriding the core projection 41 as illustrated in FIG. 5D. In FIGS. 4 and 6, for convenience of explanation, the forward traveling side tension wheel 35a and the rubber crawler 33 are partially simplified.

As illustrated in FIG. 6, when the forward traveling side tension wheel 35a overrides the core projection 41, by the amount of overriding, a biasing force that the forward traveling side tension wheel 35a biases the rubber crawler 33 is made larger (see an upward thick arrow in FIG. 6). Consequently, the tension of the rubber crawler 33 is made higher, which increases a tension load that the forward traveling side tension wheel 35a receives from the inner surface of the rubber crawler 33 in the crawler thickness direction D, especially, in the crawler thickness direction D along the front-rear direction B (see a right thick arrow in FIG. 6). Due to this, in this embodiment, a biasing load that the biasing body 50 receives from the forward traveling side tension wheel 35a is made larger. As a result, the internal pressure of the fluid element 51 in the cylinder 52 of the biasing body 50 of this embodiment is also fluctuated.

Figure 7:
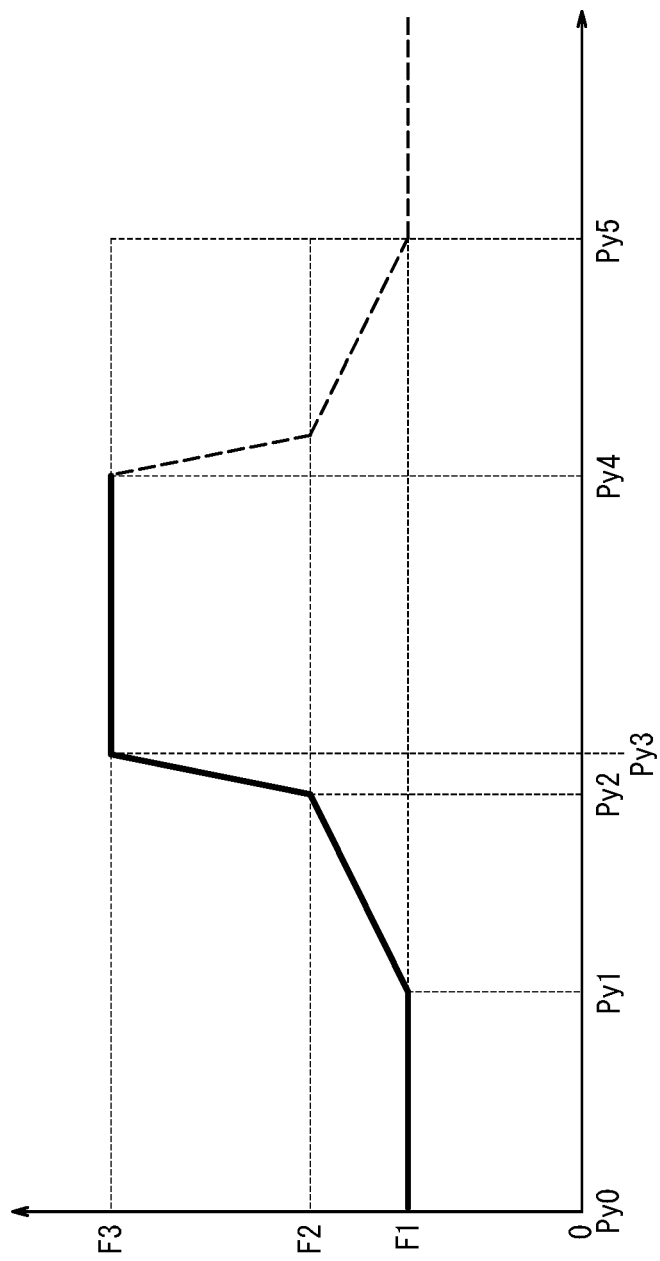
FIG. 7 is an image diagram illustrating an example of change of a load that the forward traveling side tension wheel receives from an inner surface of the rubber crawler from a state illustrated in FIG. 5A to a state illustrated in FIG. 5D.

FIG. 7 is an image diagram illustrating an example of change of a load that the forward traveling side tension wheel 35a receives from the inner surface of the rubber crawler 33 from the state illustrated in FIG. 5A to the state illustrated in FIG. 5D. An abscissa of the drawing illustrated in FIG. 7 refers to a relative position of the forward traveling side tension wheel 35a and the rubber crawler 33 in the crawler width direction C. The abscissa of the drawing illustrated in FIG. 7 uses, as a standard, a relative position of the forward traveling side tension wheel 35a and the rubber crawler 33 in the crawler width direction C in FIG. 5A ("Py0" in FIG. 7). An ordinate in FIG. 7 illustrates a load that the forward traveling side tension wheel 35a receives from the inner surface of the rubber crawler 33 in the crawler thickness direction D (hereinafter, it is referred to as "a tension load received by the forward traveling side tension wheel 35a").

More specifically, a range of "Py0" to "Py1" in the abscissa in FIG. 7 corresponds to the stage from the state illustrated in FIG. 5A to the state illustrated in FIG. 5B. A range of "Py1" to "Py3" in the abscissa of FIG. 7 corresponds to the stage from the state illustrated in FIG. 5B through the state illustrated in FIG. 5C to the state that the forward traveling side tension wheel 35a completely overrides the core projection 41. A range of "Py3" to "Py4" in the abscissa in FIG. 7 corresponds to a state that the forward traveling side tension wheel 35a completely overrides the core projection 41 as illustrated in FIG. 5D.

As illustrated in FIG. 7, the tension load received by the forward traveling side tension wheel 35a is substantially constant from the state illustrated in FIG. 5A to the state illustrated in FIG. 5B (see "F1" of FIG. 7). However, as illustrated in FIG. 7, when the forward traveling side tension wheel 35a is in the middle of overriding the side surface of the core projection 41, the core projection 41 is sandwiched between the forward traveling side tension wheel 35a and the rubber crawler 33 (see FIG. 6), so that the tension load received by the forward traveling side tension wheel 35a is made larger. As one example, FIG. 7 illustrates an example that the tension load received by the forward traveling side tension wheel 35a increases just before the forward traveling side tension wheel 35a completely overrides the core projection 41 ("Py2" to "Py3" in the abscissa in FIG. 7). However, there may be a case where such change of inclination does not exist.

Moreover, when the forward traveling side tension wheel 35a completely overrides the side surface of the core projection 41, the tension load received by the forward traveling side tension wheel 35a becomes maximum. Next, while the forward traveling side tension wheel 35a moves on a top surface of the core projection 41 ("Py3" to "Py4" in the abscissa in FIG. 7), the tension load received by the forward traveling side tension wheel 35a is substantially constant. If the forward traveling side tension wheel 35a is disengaged subsequently, as illustrated in a dashed line in FIG. 7, the tension load received by the forward traveling side tension wheel 35a is gradually reduced, and finally returns to the same as in the normal time. "Py5" of the abscissa in FIG. 7 illustrates a positional relationship at the time when the forward traveling side tension wheel 35a is completely disengaged to achieve a non-contact state of the forward traveling side tension wheel 35a and the core projection 41.

In this way, the load tension received by the tension wheel is largely fluctuated during the time that the tension wheel is disengaged from the rubber crawler 33. Consequently, disengagement of the tension wheel from the rubber crawler 33 can be previously prevented by using the tension load information acquired by the sensor 34. More specifically, in this embodiment, the control device 21 of the machine body 2 illustrated in FIG. 1 compares the tension load information acquired by the sensor 34 with a predetermined threshold value. Moreover, the control device 21 executes processing in accordance with a comparison result with the predetermined threshold value. More specifically, the sensor 34 of this embodiment acquires, as the biasing load information, the pressure of the fluid element 51 in the cylinder 52 of the biasing body 50 which biases the forward traveling side tension wheel 35a to the rubber crawler 33. In addition, when the pressure value acquired by the sensor 34 exceeds a predetermined threshold value, the control device 21 of this embodiment executes processing, including control such that the operator is notified and control such that the drive wheel 31 is stopped.

The predetermined threshold value may be, for example, a threshold value of the tension load information corresponding to the tension load received by the tension wheel when the tension wheel is in the middle of overriding the side surface of the core projection 41 ("F2" of FIG. 7). Due to this, the control device 21 can determine that the tension wheel is in the middle of overriding the side surface of the core projection 41. Further, as another predetermined threshold value, for example, a threshold value of the tension load information corresponding to the tension load received by the tension wheel in a state that the tension wheel completely overrides the side surface of the core projection 41 ("F3" of FIG. 7) may be used. In other words, as the predetermined threshold value, for example, a threshold value of the tension load information corresponding to both "F2" and "F3" in FIG. 7 may be used. The sensor 34 is configured to be able to acquire the 10) information corresponding to the tension load "F2" received by the tension wheel as the tension load information, and moreover, the information corresponding to the tension load "F3" received by the tension wheel as the tension load information. When the sensor 34 acquires the information corresponding to the tension load "F2" and "F3," the control device 21 can determine that the tension wheel completely overrides the side surface of the core projection 41 and is positioned on the top surface of the core projection 41. A value to be used as the predetermined threshold value may be the tension load information corresponding to the tension load received by the tension wheel at any position of "Py1" to "Py3" in the abscissa in FIG. 7. However, there is case that the tension wheel slips down from the side surface of the core projection 41 in the middle of overriding the side surface of the core projection 41 and returns to a position of the normal time (see FIG. 5A). Consequently, to inhibit false detection of a sign of wheel-disengagement, the value to be used as the predetermined threshold value is preferably set to the tension load information corresponding to the tension load received by the tension wheel at a position just before the tension wheel completely overrides the side surface of the core projection 41.

In this way, a situation that the tension wheel overrides the core projection 41 can be detected when the predetermined threshold value is set to the tension load information corresponding to the tension load received by the tension wheel and compared with an acquired value of the tension load information received by the sensor 34.

As described above, the control device 21 executes the processing in accordance with the comparison result with the predetermined threshold value. The processing executed by the control device 21 is various processing which can previously prevent disengagement of the tension wheel from the rubber crawler 33. More specifically, the control device 21 may execute control regarding notification to the operator or the outside based on the comparison result. For example, the control device 21 allows the notification device 24 (see FIG. 1) to notify the operator or the outside when the acquired value of the tension load information acquired by the sensor 34 reaches a predetermined threshold value corresponding to the tension load "F2," "F3" received by the tension wheel illustrated in FIG. 7. This allows the operator of the crawler traveling vehicle 1 also as the operator of the crawler traveling apparatus 3 to perceive the sign of disengagement of the tension wheel from the rubber crawler 33.

Further, the control device 21 may allow the notification device 24 to notify different notification information in accordance with the situation that the tension wheel overrides the core projection 41. For example, the control device 21 executes notification by a warning tone with a predetermined sound volume when it is determined that the tension wheel is in the middle of overriding the side surface of the core projection 41 by the tension load information acquired by the sensor 34. On the other hand, for example, the control device 21 may execute notification by a warning tone with a sound volume which is larger than the predetermined sound volume when it is determined that the tension wheel is in a state of completely overriding the core projection 41 by the tension load information acquired by the sensor 34. The different notification information is not particularly limited as long as it is information enabling a person to perceive a difference, not limited to the sound volume difference.

Also, the control device 21 may execute control regarding the drive of the drive wheel 31 based on the comparison result. For example, the control device 21 stops the drive of the drive wheel 31 by the drive device 23 when the tension load information in the crawler thickness direction D acquired by the sensor 34 reaches a predetermined threshold value corresponding to the tension load "F3" received by the tension wheel illustrated in FIG. 7. This prevents disengagement of the tension wheel from the rubber crawler 33.

Further, the control device 21 may select and execute any of the control regarding notification to the operator or the outside, and the control regarding the drive of the drive wheel 31 according to the comparison result. For example, the control device 21 executes only the control regarding notification to the operator or the outside when it is determined that the tension wheel is in the middle of overriding the side surface of the core projection 41. On the other hand, for example, the control device 21 executes stopping the drive of the drive wheel 31 when it is determined that the tension wheel is in the state of completely overriding the core projection 41.

As described above, according to the sensor 34 of the crawler traveling apparatus 3, the tension load information in the crawler thickness direction D received by the tension wheel from the inner surface of the rubber crawler 33 can be acquired. Moreover, by utilizing the tension load information acquired by the sensor 34, the sign of disengagement of the tension wheel from the rubber crawler 33 can be objectively determined. Consequently, the disengagement of the tension wheel from the rubber crawler 33 can be previously prevented.

Also, the sensor 34 of this embodiment acquires the biasing load information received by the biasing body 50 from the tension wheel as the tension load information. However, the tension load information acquired by the sensor 34 is not limited to the biasing load information, and any tension load information may be applied as long as it is the tension load information in the crawler thickness direction D that tension wheel receives from the inner surface of the rubber crawler 33. However, when there is the biasing body 50 which biases the tension wheel to the inner surface of the rubber crawler 33 as in this embodiment, the biasing load information is preferably used as the tension load information. By doing this, the biasing load information can be easily acquired using an adjustment mechanism of the biasing force by the biasing body 50, so that the tension load information can be easily acquired by the sensor 34.

Especially, in a case where the biasing force of the biasing body 50 utilizes the fluid element 51 capable of compressive deformation, the sensor 34 preferably acquires the pressure of the fluid element 51 as the biasing load information. By doing this, the tension load information can be easily acquired by the sensor 34.

Also, in a case where the fluid element 51 of the biasing body 50 is housed in the accommodation space 52a of the cylinder 52, the sensor 34 preferably acquires the internal pressure of the fluid element 51 in the accommodation space 52a. By doing this, the tension load information can be easily acquired by the sensor 34.

The crawler traveling apparatus and the crawler traveling vehicle according to the present disclosure are not limited to a concrete configuration illustrated in the embodiment, and various modifications and changes can be executed without departing from the scope of the claims. In other words, based on the tension load information in the crawler thickness direction D that the tension wheel receives from the inner surface of the rubber crawler 33, the crawler monitoring method of monitoring disengagement of the tension wheel from the rubber crawler 33, the crawler traveling apparatus which executes the crawler monitoring method, and moreover, the crawler traveling vehicle and the crawler monitoring system belong to the technical scope of the present application.

More specifically, the crawler monitoring method according to the present disclosure is the crawler monitoring method of monitoring the disengagement of the tension wheel from the rubber crawler 33 based on the load information related to the load that the tension wheel receives from the endless rubber crawler 33 wound around the drive wheel 31 and the tension wheel. More specifically, in this crawler monitoring method, the disengagement of the tension wheel from the rubber crawler 33 is monitored based on, of the load information, the tension load information in the crawler thickness direction D that the tension wheel receives from the inner surface of the rubber crawler 33.

Also, the crawler monitoring system according to the present disclosure includes the crawler traveling apparatus 3 and the control device 21 which compares the tension load information acquired by the sensor 34 with the predetermined threshold value and executes processing in accordance with the comparison result. The crawler monitoring system according to the present disclosure further may include the notification device 24 capable of notifying the comparison result of the control device 21. As an example of the processing in accordance with the comparison result, the control device 21 may control the notification information that the notification device 24 notifies the operator or the outside based on the comparison result. Also, as an example of the processing in accordance with the comparison result, the control device 21 of the crawler monitoring system according to the present disclosure may control the drive of the drive wheel 31 of the crawler traveling apparatus 3 based on the comparison result.

The crawler traveling vehicle 1 of the above-described embodiment has the configuration that the machine body 2 has the control device 21. However, the control device 21 of the crawler monitoring system according to the present disclosure may be configured by an external apparatus positioned at an outer portion of the crawler traveling vehicle 1. For example, the control device 21 of the crawler monitoring system may be provided to a server as the external apparatus positioned at the outer portion of the crawler traveling vehicle 1. Further, the crawler monitoring system may include the operating device 22, the notification device 24 and the pressure adjusting device 25. Also, the crawler monitoring system further may include other devices such as the communication device. The operating device 22, the notification device 24, the pressure adjusting device 25 and other devices in the crawler monitoring system may be configured by the external apparatus positioned at the outer portion of the crawler traveling vehicle 1 in the same manner as the control device 21. The control device 21, the operating device 22, the notification device 24, the pressure adjusting device 25 and other devices may be respectively provided to different external apparatuses.

Also, while the crawler traveling vehicle 1 of the above-described embodiment has the configuration that the machine body 2 includes the control device 21 and the notification device 24, for example, it may have the configuration that the crawler traveling apparatus 3 includes the control device 21 and the notification device 24. Moreover, the crawler traveling apparatus 3 may include other devices.

INDUSTRIAL APPLICABILITY

The present disclosure relates to the crawler traveling apparatus, the crawler monitoring system, the crawler traveling vehicle and the crawler monitoring method.

The invention claimed is:

1. A crawler traveling apparatus comprising:
an endless rubber crawler;
a drive wheel which drives to rotate the rubber crawler in a crawler circumferential direction;
a tension wheel which stretches the rubber crawler together with the drive wheel and which is rotated following the rubber crawler; and
a sensor which can acquire load information related to a load that the tension wheel receives from the rubber crawler,
wherein the rubber crawler includes an endless crawler belt and a plurality of cores which are arranged along the crawler circumferential direction of the crawler belt at intervals and embedded in the crawler belt,
each core includes a pair of core projections which project from an inner surface of the crawler belt and are arranged apart in a crawler width direction,
the tension wheel abuts the inner surface of the crawler belt or an inner surface of the core at least, in the crawler width direction, at any of a position between the pair of core projections and positions outside of the pair of core projections,
the sensor can acquire tension load information in a crawler thickness direction that the tension wheel receives from the inner surface of the crawler belt or the inner surface of the core as the load information,
the crawler traveling apparatus further comprising:
a control device which compares the tension load information acquired by the sensor with predetermined threshold values, and
a notification device which can notify a comparison result of the control device,
wherein the control device allows the notification device to notify the comparison result without stopping the drive wheel when the tension load information acquired by the sensor reaches a first predetermined threshold value, and
wherein the control device stops the drive wheel when the tension load information acquired by the sensor exceeds the first predetermined threshold value and reaches a second predetermined threshold value.

2. The crawler traveling apparatus according to claim 1, further comprising a biasing body which biases the tension wheel toward the rubber crawler,
the sensor acquires biasing load information that the biasing body receives from the tension wheel as the tension load information.

3. The crawler traveling apparatus according to claim 2, wherein the biasing body includes a fluid element capable of compressive deformation,
the sensor acquires a pressure of the fluid element as the biasing load information.

4. The crawler traveling apparatus according to claim 3, wherein the biasing body comprises:
the fluid element;
a cylinder which houses the fluid element in an internal accommodation space; and
a piston rod which enters the accommodation space from an end of the cylinder and can compress the fluid element by moving in an axial direction of the cylinder,
the sensor acquires an internal pressure of the fluid element in the accommodation space.

5. The crawler traveling apparatus according to claim 4, wherein a connecting section which can be connected to a pressure adjusting device which adjusts the internal pressure of the fluid element is provided to the cylinder,
the sensor is attached to the connecting section.

6. A crawler traveling vehicle comprising:
a machine body which includes an operator's cab which an operator can get in; and
a crawler traveling apparatus which supports the machine body such that the machine body is self-propelled,
the crawler traveling apparatus comprises:
an endless rubber crawler;
a drive wheel which drives to rotate the rubber crawler in a crawler circumferential direction;
a tension wheel which stretches the rubber crawler together with the drive wheel and which is rotated following the rubber crawler; and
a sensor which can acquire load information related to a load that the tension wheel receives from the rubber crawler,
wherein the machine body includes:
a control device which compares the load information acquired by the sensor with predetermined threshold values, and
a notification device which can notify a comparison result of the control device,
the rubber crawler comprises:
an endless crawler belt; and
a plurality of cores which are arranged along the crawler circumferential direction of the crawler belt at intervals and embedded in the crawler belt, wherein each core includes a pair of core projections which protrude from an inner surface of the crawler belt and are arranged apart in a crawler width direction, the tension wheel abuts the inner surface of the crawler belt or an inner surface of the core at least, in the crawler width direction, at any of a position between the pair of core projections and positions outside of the pair of core projections, the sensor can acquire tension load information in a crawler thickness direction that the tension wheel receives from the inner surface of the crawler belt or the inner surface of the core as the load information, the control device compares the tension load information acquired by the sensor with predetermined threshold values, wherein the control device allows the notification device to notify the comparison result without stopping the drive wheel when the tension load information acquired by the sensor reaches a first predetermined threshold value, and wherein the control device stops the drive wheel when the tension load information acquired by the sensor exceeds the first predetermined threshold value and reaches a second predetermined threshold value.

7. The crawler traveling vehicle according to claim 6, wherein the crawler traveling apparatus includes a biasing body which biases the tension wheel toward the rubber crawler, the sensor acquires biasing load information that the biasing body receives from the tension wheel as the tension load information.

8. The crawler traveling vehicle according to claim 7, wherein the biasing body of the crawler traveling apparatus includes a fluid element capable of compressive deformation, the sensor acquires a pressure of the fluid element as the biasing load information.

9. The crawler traveling vehicle according to claim 8, wherein the biasing body of the crawler traveling apparatus comprises:

the fluid element;

a cylinder which houses the fluid element in an internal accommodation space; and a piston rod which enters the accommodation space from an end of the cylinder and can compress the fluid element by moving in an axial direction of the cylinder, the sensor acquires an internal pressure of the fluid element in the accommodation space.

10. The crawler traveling vehicle according to claim 9, wherein a connecting section which can be connected to a pressure adjusting device which adjusts the internal pressure of the fluid element is provided to the cylinder, the sensor is attached to the connecting section.

11. A crawler monitoring method of monitoring disengagement of a tension wheel from an endless rubber crawler based on load information related to a load that the tension wheel receives from the rubber crawler stretched by a drive wheel and the tension wheel, wherein the rubber crawler includes an endless crawler belt and a plurality of cores which are arranged along a crawler circumferential direction of the crawler belt at intervals and embedded in the crawler belt, each core includes a pair of core projections which project from an inner surface of the crawler belt and are arranged apart in a crawler width direction, the tension wheel abuts the inner surface of the crawler belt or an inner surface of the core at least, in the crawler width direction, at any of a position between the pair of core projections and positions outside of the pair of core projections, disengagement of the tension wheel from the rubber crawler is monitored based on tension load information in a crawler thickness direction that the tension wheel receives from the inner surface of the crawler belt or the inner surface of the core as the load information, wherein the drive wheel is not stopped and the tension load information is notified to an operator when the tension load information reaches a first predetermined threshold value, and wherein the drive wheel is stopped when the tension load information exceeds the first predetermined threshold value and reaches a second predetermined threshold value.

* * * * *